United States Patent [19]
Nechay

[11] 3,890,061
[45] June 17, 1975

[54] RESILIENT HUB ASSEMBLY

[75] Inventor: Jacek A. Nechay, Avon, Conn.

[73] Assignee: Torin Corporation, Torrington, Conn.

[22] Filed: Jan. 2, 1974

[21] Appl. No.: 429,570

[52] U.S. Cl. .............................................. 416/134
[51] Int. Cl. ............................................ F04d 29/20
[58] Field of Search ................................... 416/134

[56] References Cited
UNITED STATES PATENTS

| | | | |
|---|---|---|---|
| 2,097,318 | 10/1937 | Dowell | 416/134 |
| 2,129,933 | 9/1938 | Hueglin | 416/134 |
| 2,235,605 | 3/1941 | Bugatti | 416/134 |
| 2,802,353 | 8/1957 | Peirce | 416/134 X |
| 2,853,140 | 9/1958 | Forth | 416/134 |
| 2,974,984 | 3/1961 | Koch | 416/134 X |

FOREIGN PATENTS OR APPLICATIONS

| 171,983 | 7/1960 | Sweden | 416/134 |
|---|---|---|---|

*Primary Examiner*—Everette A. Powell, Jr.
*Attorney, Agent, or Firm*—McCormick, Paulding & Fluker

[57] ABSTRACT

An inexpensive resilient hub assembly for fans and blowers including first and second rigid members respectively in driving and driven relationship and an intermediate molded in situ elastomer to provide resilience. The driving member takes the form of a cylinder with a through bore for mounting on a shaft and a set screw is provided for positive attachment. The driven member comprises a formed sheet metal cup having a radially outwardly projecting annular flange. The closed end of the cup is spaced axially from the end of the driven member and the side wall thereof is spaced radially from the driving member with the elastomer intermediate member disposed therebetween. A spider for an axial fan or an end or center disc for a blower wheel may be attached to the annular flange at the open end of the cup. The elastomer is preferably neoprene and is molded in situ and bonded to each of the rigid members as indicated.

4 Claims, 3 Drawing Figures 3,890,061

RESILIENT HUB ASSEMBLY

BACKGROUND OF THE INVENTION

Resilient hub assemblies find wide application in the manufacture of fans, blowers, and other fluid moving devices of the rotatable type. Further, an improved simple and inexpensive resilient hub assembly has long been sought in the fan and blower industry.

SUMMARY OF THE INVENTION

It is the general object of the present invention to provide an improved resilient hub assembly which is highly effective in the transmission of torque and yet provides the desired resilient connection and low cost characteristics both as to material expenditure and simplicity and economy of manufacturing method.

DESCRIPTION OF PREFERRED EMBODIMENTS

Figure 1:
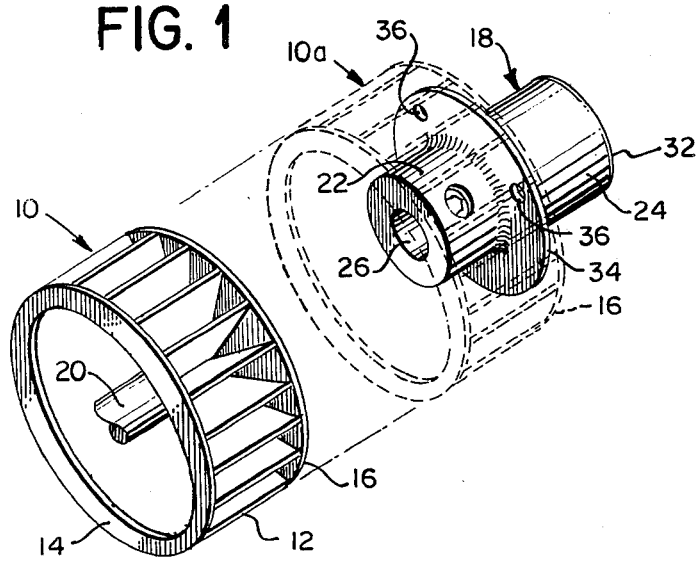
FIG. 1 is an exploded perspective view of a small blower wheel equipped with a resilient hub constructed in accordance with the present invention.

Referring particularly to FIG. 1, a rotary fluid moving device in the form of a small conventional blower wheel is indicated generally at 10. The blower wheel 10 includes a plurality of circumaxially arranged and axially extending fluid moving blades 12. End ring 14 at the left-hand portion of the wheel supports the blades and an end plate 16 at a right-hand end portion thereof similarly supports the blades and has centrally or radially inwardly connected thereto a hub assembly indicated generally at 18. A suitable drive shaft 20 connected with the hub assembly rotatably drives the subassembly together with the blower wheel. The hub assembly 18 is shown partially exploded in association with a phantom blower wheel 10a in order to better illustrate the relative positions of the hub assembly and the end disc or plate 16 of the blower wheel.

The end disc or plate 16 may vary widely in form and the said plate together with the connection thereof with the hub assembly 18 is to be regarded as illustrative only. Obviously, the resilient hub of the present invention is readily useable with other fluid moving devices, as for example, with an axial fan wherein the hub assembly can be connected with the fan spider. In either event, with a blower wheel or axial fan, the connection of the hub assembly is preferably effected at an inner portion of a radially extending thin member such as the end plate 16 of the blower wheel 10.

Figure 2:
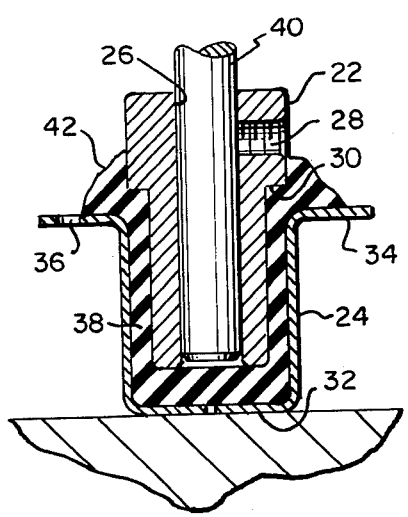
FIG. 2 is a vertical transverse section through the resilient hub after molding of the elastomer in situ.
Figure 3:
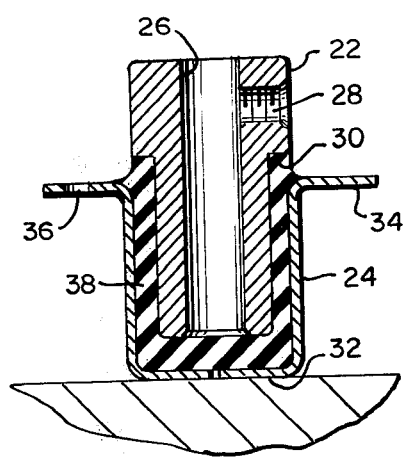
FIG. 3 is a view similar to FIG. 2 but showing the completed hub after trimming of the elastomer.

Referring particularly to FIGS. 2 and 3, it will be observed that the resilient hub assembly comprises first and second or driving and driven rigid members 22, 24. The members 22, 24 may vary widely in construction, but preferably and as shown, the member 22 takes a cylindrical form with a through bore 26. The bore 26 receives a drive shaft such as the aforementioned shaft 20 and has an associated positive attachment means in the form of a set screw and a suitably threaded opening 28. The opening 28 of course, extends laterally into communication with the bore 26 preferably an annular shoulder 30 extends radially about the cylindrical member 22, and is spaced axially from the driven member 24 as shown. The purpose of the said shoulder will be set forth hereinbelow.

The driven member 24, in the presently preferred form shown, takes a cup-configuration and has its closed end portion 32 spaced axially from the end portion of the cylindrical driving member 22. Similarly, the side wall of the member 24 is spaced radially from the cylindrical member 22. At the upper or open end portion of the cup-shaped member 24, an annular flange 34 projects radially outwardly and, as best illustrated in FIG. 3, suitable openings 36, 36 are provided therein for the attachment of an end disc plate such as 16 or for attachment of a fan spider. While a riveting procedure is presently preferred other conventional attachment means may, of course, be employed.

The intermediate member of the hub at 38 is an elastomer and in accordance with the presently preferred practice, neoprene is employed. Further, a molded in situ method of construction is preferred. That is, the rigid members 22, 24 may be held in position as illustrated in FIG. 2 and a plug such as 40 inserted in the bore 26 for the introduction of elastomer 38 to the mold cavity thus formed. When the elastomer has been vulcanized excess material at 42 may be trimmed off as illustrated in FIG. 3 and the plug 40 removed whereby to provide for the introduction of a drive shaft such as 20.

The elastomer 38 of course provides for a driving connection between the driving member 22 and the driven member 24, the elastomer being bonded to each of said members. Further, transient movement of the drive member 22 are not transmitted to the driven member 24, this condition holding in the case of torsional as well as axial and radial transient movements. As will be apparent, the elastomer is captured axially between the end of the cylindrical member 22 and the closed end of the cup 24. Further, the elastomer is captured radially between side of the cylindrical member 22 and the side wall of the cup 24. Still further, the annular shoulder 30 provides for axial capture of that portion of the elastomer residing axially between the shoulder and the closed end 32 of the cup.

In addition to the foregoing, it will be apparent that the completed hub provides for protection of the elastomer from the elements. The use of the cup-shaped rigid member 24 eliminates exposure of the elastomer to various atmospheric conditions of moisture, temperature, ozone content etc. The hub may be constructed at economic advantage due to the direct and simple method of molding in situ and yet a highly effective resilient hub having efficient torque transmission characteristics is provided. Of particular importance, is the efficiency of the hub is isolating driving and driven members from the alternating current induced frequencies (for example 120, 240 cps) at 60 cps/A.C.

I claim:
1. An air impeller comprising:
   a plurality of circumaxially arranged air moving blades,
   at least one generally radially extending outer blade support member connected at a radially outwardly located portion with said air moving blades and adapted at a radially inwardly located area for connection with a hub assembly,
   a hub assembly comprising first and second rigid hub members respectively in driving and driven relationship with each other and the latter of which has an inner blade support member integral thereon and in the form of an annular radial flange drivingly connected at a radially outwardly located portion with said radially inwardly located area of said radially extending outer blade support member, said driven hub member also having an annular axially extending wall integral with and extending from said flange and a radially extending end wall integral with said annular axial wall, said hub member thus taking a flanged-cup configuration, said driving hub member being adapted to be mounted on and driven by a suitable shaft and having a first cylindrical section disposed within and with peripheral side and radial end walls spaced respectively from said annular axial and radial end walls of said driven hub member, said driving member also having an enlarged second cylindrical section integral with said first cylindrical section and spaced axially outwardly from said annular flange whereby to define an annular shoulder extending radially outwardly and facing axially toward said flange on said driven hub member, and said hub assembly also comprising an intermediate and resilient hub member having a cup-shape and connected in driving relationship between said driving and driven hub members, said resilient hub member comprising a molded in situ elastomer with an annular cup side wall disposed between and bonded to said annular and axially extending wall of said driven hub member and said peripheral side wall of said driving hub member, and a radial cup end wall disposed between and bonded to said radially extending end wall of said driven hub member and said radial end wall of said driving hub member, and said annular cup side wall also projecting axially beyond said axially extending annular side wall of said driven hub member and being bonded to said radial shoulder on said driving hub member with an annular portion thereof exposed radially outwardly between said shoulder and said annular flange on said driven hub member.

2. An air impeller as set forth in claim 1 wherein:
said impeller takes the form of a blower wheel with said circumaxially arranged blades extending axially and said radially extending outer blade support member comprising a rigid disc supporting said blades and connected with said hub assembly about said annular flange as aforesaid.

3. An air impeller as set forth in claim 1 wherein:
said rigid driving member has positive shaft attachment means in the form of a suitably threaded opening in said second cylindrical section for receiving a set screw.

4. An air impeller as set forth in claim 3 wherein:
said intermediate resilient hub member comprises a neoprene.

* * * * *